(12) United States Patent
Benazzi et al.

(10) Patent No.: US 6,344,135 B1
(45) Date of Patent: Feb. 5, 2002

(54) HYDROCRACKING PROCESS USING A CATALYST COMPRISING AN IM-5 ZEOLITE AND A CATALYST COMPRISING AN IM-5 ZEOLITE AND A PROMOTER ELEMENT

(75) Inventors: Eric Benazzi, Chatou; Slavik Kasztelan, Rueil Malmaison, both of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/511,490

(22) Filed: Feb. 23, 2000

(30) Foreign Application Priority Data

Feb. 24, 1999 (FR) .............................................. 99 02335
Feb. 24, 1999 (FR) .............................................. 99 02334

(51) Int. Cl.$^7$ ...................... C10G 47/16; C10G 47/18; C10G 47/20
(52) U.S. Cl. .................. 208/111.01; 208/109; 208/110; 208/111.05; 208/111.2; 208/111.3; 208/111.35
(58) Field of Search ................ 208/109, 110, 208/111.01, 111.05, 111.2, 111.3, 111.35

(56) References Cited

U.S. PATENT DOCUMENTS

| 3,968,023 A | * | 7/1976 | Yan | 208/86 |
| 4,645,586 A | * | 2/1987 | Buss | 208/65 |
| 4,777,157 A |   | 10/1988 | Koepke et al. | 502/66 |
| 5,062,943 A | * | 11/1991 | Apelian et al. | 208/59 |
| 5,643,440 A | * | 7/1997 | Borghard et al. | 208/58 |
| 5,968,475 A | * | 10/1999 | Benazzi et al. | 423/713 |
| 5,989,410 A | * | 11/1999 | Benazzi et al. | 208/134 |
| 6,007,698 A | * | 12/1999 | Benazzi et al. | 208/120.01 |
| 6,136,290 A | * | 10/2000 | Benazzi et al. | 423/705 |

FOREIGN PATENT DOCUMENTS

| EP | 0 855 435 | 7/1998 |
| EP | 0 922 494 | 6/1999 |
| FR | 2 754 809 | 4/1998 |
| FR | 2 758 278 | 7/1998 |
| FR | 2 758 810 | 7/1998 |

* cited by examiner

Primary Examiner—Nadine Preisch
(74) Attorney, Agent, or Firm—Millen, WHite, Zelano & Branigan, P.C.

(57) ABSTRACT

The invention concerns a hydrocracking process using a catalyst comprising at least one matrix, an IM-5 zeolite, at least one metal selected from the group formed by metals from group VIB and group VIII of the periodic table, optionally at least one element selected from the group formed by phosphorous, boron and silicon, and optionally at least one group VIIA and/or at least one group VIIB and/or at least one group VB element (in particular niobium). The invention also concerns a catalyst containing at least one matrix, an IM-5 zeolite, at least one metal from groups VIII and/or VIB and at least one promoter element which is boron and/or silicon. The catalyst can also contain at least one group VIIA element and/or at least one group VIIB element and/or at least one group VB element.

16 Claims, No Drawings

HYDROCRACKING PROCESS USING A CATALYST COMPRISING AN IM-5 ZEOLITE AND A CATALYST COMPRISING AN IM-5 ZEOLITE AND A PROMOTER ELEMENT

The present invention relates to a hydrocracking process comprising at least one matrix, an IM-5 zeolite, at least one hydrodehydrogenating metal preferably selected from the group formed by metals from group VIB and group VIII of the periodic table, optionally at least one promoter element selected from the group formed by phosphorous, boron and silicon, optionally at least one group VIIA element, optionally at least one group VIIB element and optionally at least one group VB element. The invention also relates to a catalyst based on IM-5 zeolite, containing at least one hydrodehydrogenating metal selected from the group formed by group VI and group VIII metals, and containing at least one promoter element selected from the group formed by boron and silicon.

Hydrocracking heavy petroleum feeds is a very important refining process which produces lighter fractions such as gasoline, jet fuel and light gas oil from surplus heavy feeds of low intrinsic value, which lighter fractions are needed by the refiner to enable production to be matched to demand. Some hydrocracking processes can also produce a highly purified residue which can constitute an excellent base for oils. The advantage of catalytic hydrocracking over catalytic cracking is that it can provide very good quality middle distillates, jet fuels and gas oils. The gasoline produced has a much lower octane number than that resulting from catalytic cracking.

All catalysts used for hydrocracking are bifunctional, combining an acid function and a hydrogenating function. The acid function is supplied by large surface area supports (150 to 800 m²/g in general) with a superficial acidity, such as halogenated aluminas (in particular fluorinated or chlorinated), combinations of boron and aluminum oxides, amorphous silica-aluminas and zeolites. The hydrogenating function is supplied either by one or more metals from group VIII of the periodic table, or by a combination of at least one metal from group VIB of the periodic table, and at least one group VIII metal.

The equilibrium between the two, acid and hydrogenating, functions is the fundamental parameter which governs the activity and selectivity of the catalyst. A weak acid function and a strong hydrogenating function produces low activity catalysts which generally operate at a high temperature (390° C. or above), and at a low supply space velocity (HSV, expressed as the volume of feed to be treated per unit volume of catalyst per hour, and is generally 2 h$^{-1}$ or less), but have very good selectivity for middle distillates. In contrast, a strong acid function and a weak hydrogenating function produces very active catalysts but selectivities for middle distillates are poorer. The search for suitable catalysts thus revolves around the proper selection of each of the functions to adjust the activity/selectivity balance of the catalyst.

Thus one of the great interests of hydrocracking is to have a high degree of flexibility at various levels: flexibility as regards the catalysts used, which provides flexibility in the feeds to be treated and in the products obtained. One parameter which is easily mastered is the acidity of the catalyst support.

The vast majority of conventional hydrocracking catalysts are constituted by low aridity supports such as amorphous silica-aluminas. These systems are more particularly used to produce very high quality middle distillates and again, when their acidity is very low, base oils.

Amorphous silica-aluminas are low acidity supports. Many of the catalysts in the hydrocracking industry are based on silica-alumina associated either with a group VIII metal or, as is preferable when the heteroatomic poison content in the feed to be treated exceeds 0.5% by weight, a combination of sulphides of group VIB and VIII metals. These systems have very good selectivity for middle distillates, and good quality products are formed. The least acid of such catalysts can also produce lubricating bases. The disadvantage of all of such catalytic systems based on an amorphous support is, as has been stated, their low activity.

Catalysts comprising a Y zeolite with structure type FAU, or beta type catalysts have a catalytic activity which is higher than that of amorphous silica-aluminas, but have hither selectivities for light products.

The research carried out by the Applicant on numerous zeolites and microporous crystalline solids have led to the surprising discovery that a catalyst based on an IM-5 zeolite can achieve a catalytic activity and kerosine and gasoline selectivities which are substantially improved over catalysts containing a prior art zeolite.

More precisely, the invention provides a process for hydrocracking hydrocarbon-containing feeds in which the feed to be treated is brought into contact with a catalyst comprising at least one amorphous or low crystallinity matrix of an oxide type, at least one IM-5 zeolite and at least one hydrodehydrogenating element.

The IM-5 zeolite used in the present invention has been described in French patent FR-A-2 754 809. The invention also encompasses any zeolite of the same structure type as that of IM-5 zeolite.

The zeolitic structure, termed IM-5, has a chemical composition with the following formula, expressed in terms of the mole ratios of the oxides for the anhydrous state:

$$100XO_2, mY_2O_3, pR_{2/n}O$$

where m is 10 or less;

p is in the range 0 (excluded) to 20;

R represents one or more cations with valency n;

X represents silicon and/or germanium, preferably silicon;

Y is selected from the group formed by the following elements: aluminum, iron, gallium, boron, and titanium, Y preferably being aluminum; and is characterized by an X ray diffraction diagram, in its as synthesised state, which comprises the peaks shown in Table 1.

TABLE 1

| $d_{hkl}$ (Å) | $I/I_{max}$ |
|---|---|
| 11.8 ± 0.35 | s to vs (1) |
| 11.5 ± 0.30 | s to vs (1) |
| 11.25 ± 0.30 | s to vs (1) |
| 9.95 ± 0.20 | m to s |
| 9.50 ± 0.15 | m to s |
| 7.08 ± 0.12 | w to m |
| 6.04 ± 0.10 | vw to w |
| 5.75 ± 0.10 | w |
| 5.65 ± 0.10 | w |
| 5.50 ± 0.10 | vw |
| 5.35 ± 0.10 | vw |

TABLE 1-continued

X ray diffraction table for IM-5 zeolite, as synthesised state

| $d_{hkl}$ (Å) | $I/I_{max}$ |
|---|---|
| 5.03 ± 0.09 | vw |
| 4.72 ± 0.08 | w to m |
| 4.55 ± 0.07 | w |
| 4.26 ± 0.07 | vw |
| 3.92 ± 0.07 | s to vs (2) |
| 3.94 ± 0.07 | vs (2) |
| 3.85 ± 0.05 | vs (2) |
| 3.78 ± 0.04 | s to vs (2) |
| 3.67 ± 0.04 | m to s |
| 3.55 ± 0.03 | m to s |
| 3.37 ± 0.02 | w |
| 3.30 ± 0.015 | w |
| 3.099 ± 0.012 | w to m |
| 2.970 ± 0.007 | vw to w |
| 2.815 ± 0.005 | vw |
| 2.720 ± 0.005 | vw |

(1) Peaks forming part of the same feature.
(2) Peaks forming part of the same feature.

The IM-5 zeolite in its hydrogen form, designated H-IM-5, is obtained by calcining step(s) and/or ion exchange step(s) as will be explained below. The H-IM-5 zeolite has an X ray diffraction diagram which comprises the results shown in Table 2.

TABLE 2

X ray diffraction table for IM-5 zeolite in its hydrogen form, H-IM-5, obtained by calcining

| $d_{hkl}$ (Å) | $I/I_{max}$ |
|---|---|
| 11.8 ± 0.30 | s to vs (1) |
| 11.45 ± 0.25 | vs (1) |
| 11.20 ± 0.20 | s to vs (1) |
| 9.90 ± 0.15 | m to s |
| 9.50 ± 0.15 | m to s |
| 7.06 ± 0.12 | w to m |
| 6.01 ± 0.10 | vw to w |
| 5.70 ± 0.10 | w |
| 5.30 ± 0.10 | vw |
| 5.03 ± 0.09 | vw |
| 4.71 ± 0.08 | w |
| 4.25 ± 0.07 | vw |
| 3.87 ± 0.07 | m to s (2) |
| 3.81 ± 0.05 | m to s (2) |
| 3.76 ± 0.04 | m to s (2) |
| 3.67 ± 0.04 | w to m |
| 3.54 ± 0.04 | m to s |
| 3.37 ± 0.03 | w |
| 3.316 ± 0.015 | w |
| 3.103 ± 0.102 | w |
| 3.080 ± 0.010 | w to m |
| 2.950 ± 0.010 | vw to w |
| 2.880 ± 0.007 | vw |
| 2.790 ± 0.005 | vw |
| 2.590 ± 0.005 | vw |

(1) Peaks form part of the same feature.
(2) Peaks form part of the same feature.

These diagrams were obtained using a diffractometer and a conventional powder method utilising the $K_\alpha$ line of copper. From the position of the diffraction peaks represented by the anole 2θ, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 10;
weak (w) means less than 20;
medium (m) means in the range 20 to 40;
strong (s) means in the range 40 to 60;
very strong (vs) means more than 60.

The IM-5 zeolite can thus be used in its "as synthesised" form and in forms obtained by dehydration and/or calcining and/or ion exchange. The expression "in its as synthesised form" means the product obtained by synthesis and washing with or without drying or dehydration. In its "as synthesised" form, the IM-5 zeolite can comprise a cation of metal M, which is an alkali, in particular sodium, and/or ammonium, and it can comprise organic nitrogen-containing cations such as those described below or their decomposition products, or precursors thereof. These organic nitrogen-containing cations are designated here by the letter Q, which also includes decomposition products and precursors of said nitrogen-containing organic cations.

The calcined forms of the IM-5 zeolite contain no organic nitrogen-containing compounds, or a lower quantity than in the "as synthesised form", provided that the majority of the organic substance has been eliminated, generally by a heat treatment consisting of burning the organic substance in the presence of air, the hydrogen ion ($H^+$) thus forming the other cation.

Of the TM-5 zeolite form5 which can be obtained by ion exchange, the ammonium form ($NH_4^+$) is important as it can readily be converted into the hydrogen form by calcininig. The hydrogen form and forms containing metals introduced by ion exchange will be described below.

In some cases, the fact that the zeolite of the invention is subjected to the action of an acid can give rise to partial or complete elimination of a base element such as aluminum, as well as generation of the hydrogen form. This may constitute a means of modifying the composition of the substance after it has been synthesised.

IM-5 zeolite in its hydrogen form (acid form), termed H-IM-5, is produced by calcining and ion exchange as will be described below.

The IM-5 zeolite can also be used at least partially in its $H^+$ form (as defined above) or in its $NH_4^+$ form or in its metallic form, said metal being selected from the group formed by groups IA, IB, IIA, IIB, IIIA, IIIB (including the rare earths), VIII, Sn, Pb and Si, preferably at least partially in its $H^+$ form or at least partially in its metal form.

Preferably, the IM-5 zeolite is at least partially in its acid form (and preferably completely in its H form) or partially exchanged with metal cations, for example alkaline-earth metal cations.

The IM-5 zeolites which form part of the composition of the invention are used with the silicon and aluminum contents obtained on synthesis.

It is also possible to use dealuminated IM-5 zeolite, which is described in French patent FR-A-2 758 810, and which has an overall Si/Al atomic ratio of more than 5, preferably more than 10, more preferably more than 15, and still more preferably in the range 20 to 400.

The IM-5 zeolite is advantageously at least partially and preferably almost completely in its acid form.

The Na/Al atomic ratio is generally less than 0.45, preferably less than 0.30 and still more preferably less than 0.15.

To prepare the dealuminated IM-5 zeolite of the invention, at least two delamination methods can be used starting from as synthesised IM-5 zeolite comprising an organic structuring agent. They are described below. However, any other method which is known to the skilled person can also be used.

The first method, direct acid attack, comprises a first calcining step carried out in a stream of dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an or, organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more optional ion exchange steps can be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

The second method, heat treatment (in particular using steam, by steaming)+acid attack, comprises firstly calcining in a stream of dry air at a temperature which is generally in the range 450° C. to 550° C., to eliminate the organic structuring agent occluded in the micropores of the zeolite. The solid obtained then undergoes one or more ion exchanges using at least one $NH_4NO_3$ solution, to eliminate at least a portion and preferably practically all of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 550° C. to 900° C., and optionally followed by at least one acid attack using an aqueous solution of a mineral or organic acid. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment- acid attack cycles can be varied.

The framework dealumination cycle, comprising at least one heat treatment step, optionally and preferably carried out in the presence of steam, and at least one attack step of the IM-5 zeolite carried out in an acid medium, can be repeated as often as is necessary to obtain the dealuminated IM-5 zeolite having the desired characteristics. Similarly, following the heat treatment, optionally and preferably carried out in the presence of steam, a number of successive acid attacks can be carried out using different acid concentrations.

In a variation of this second calcining method, heat treatment of the IM-5 zeolite containing the organic structuring agent can be carried out at a temperature which is generally in the range 550° C. to 850° C., optionally and preferably in the presence of steam. In this case, the steps of calcining the organic structuring agent and dealumination of the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally be subjected to at least one ion exchange step using at least one $NH_4NO_3$ solution, to eliminate practically all of the alkaline cations, in particular sodium, present in the cationic position in the zeolite.

The zeolite is then used with the Si/Al ratio obtained after dealumination.

The catalyst also comprises a hydrogenating function which is generally ensured by at least one metal selected from the group formed by metals from group VIB and group VIII of the periodic table.

The catalyst of the present invention can comprise an element from group VIII such as iron, cobalt, nickel, ruthenium, rhodium, palladium, osmium, iridium or platinum. Preferred group VIII elements are non noble metals such as iron, cobalt and nickel. The catalyst of the invention can comprise a group VIB element, preferably tungsten and molybdenum. Advantageously, combinations of at least one non noble metal from group VIII and at least one group VIB metal are used. Preferred combinations are: nickel-molybdenum, cobalt-molybdenum, iron-molybdenum, iron-tungsten, nickel-tungsten, cobalt-tungsten. Preferred combinations are: nickel-molybdenum, cobalt-molybdenum and nickel-tungsten. It is also possible to use combinations of three elements, for example nickel-cobalt-molybdenum.

The catalyst of the present invention also comprises at least one porous amorphous or low crystallinity oxide type mineral matrix. Non limiting examples are alumina, silica and silica-alumina, clays (for example natural clays such as kaolin or bentonite), magnesia, titanium oxide, boron oxide, zirconia, aluminum phosphates, titanium phosphates, zirconium phosphates, charcoal. Aluminates can also be selected. Preferably, matrices containing alumina are used in any of its forms which are known to the skilled person, more preferably aluminas, for example gamma alumina.

In one implementation of the invention, the catalyst comprises at least one promoter element selected from the group formed by boron, silicon and phosphorous. A preferred catalyst comprises boron and/or silicon as the promoter element, more preferably boron and silicon.

The catalyst can optionally comprise at least one group VIIA element, preferably chlorine and fluorine, and optionally at least one group VIIB element (preferably Mn).

The catalyst can optionally comprise at least one group VB element (Ta, Nb, V), preferably niobium.

When the catalyst contains silicon, the silicon is introduced onto the support of the invention as a promoter. The silicon is primarily located on the support matrix and can be characterized by techniques such as a Castaing microprobe (distribution profile of the various elements), transmission electron microscopy coupled with X ray analysis of the catalyst components, or by establishing a distribution map of the elements present in the catalyst using an electron microprobe.

The invention also provides a catalyst comprising at least one amorphous or low crystallinity oxide type matrix, an IM-5 zeolite, at least one hydrodehydrogenating element selected from the group formed by group VIII metals and group VIB metals, and at least one promoter element selected from the group formed by boron and silicon. Advantageously, the catalyst also comprises phosphorous. Optionally, the catalyst can also comprise at least one group VIIB element and/or at least one group VIIA element and/or at least one group VB element. These catalysts are advantageously used for hydrocracking.

The catalyst of the present invention generally comprises, as a % by weight with respect to the total catalyst mass:
- 0.1% to 60%, preferably 0.1% to 50%. More preferably 0.1% to 40% of at least one hydrodehydrogenating metal, advantageously selected from the group formed by group VIB and group VIII metals;
- 0.1% to 99%, preferably 1% to 98%, of at least one porous amorphous or low crystallinity oxide type mineral matrix; said catalyst also comprising 0.1% to 99.8%, preferably 0.1% to 90%, preferably 0.1% to 80%, still more preferably 0.1% to 60%, of IM-5 zeolite; said catalyst optionally containing:

0 to 20%, advantageously 0.1% to 20%, preferably 0.1% to 15%, still more preferably 0.1% to 10%, of at least one promoter element selected from the group formed by silicon, boron and phosphorous, not including the silicon which is optionally contained in the IM-5 zeolite;

0 to 20%, advantageously 0.1% to 20%, preferably 0.1% to 15%, still more preferably 0.1% to 10%, of at least one element selected from group VIIA, preferably fluorine;

0 to 20%, advantageously 0.1% to 20%, preferably 0.1% to 15%, still more preferably 0.1% to 10%, of at least one element selected from group VIIB, preferably manganese;

0 to 60%, preferably 0.1% to 60%, advantageously 0.1% to 50%, still more preferably 0.1% to 40%, of at least one element selected from group VB.

A preferred catalyst comprises, in % by weight with respect to the total catalyst mass:

0.1% to 99.7% of IM-5 zeolite;
0.1% to 60% of at least one hydrodehydrogenating metal;
0.1% to 99% of at least one matrix;
0 0.1% to 20% of boron and/or silicon;
0 to 20% of phosphorous, the sum of the quantities of boron and/or phosphorous and/or silicon being at most 20%;
0 to 20% of at least one group VIIA element;
0 to 20% of at least one group VIIB element;
0 to 60% of at least one group VB element.

This catalyst can also comprise all the characteristics described above: the preferred ranges of values for the components, the preferred components, and optional groups VIIA, VIIB and VB.

The group VIB metals, group VIII metals, group VIIB metals and group VBI metals of the catalyst of the present invention can also be present completely or partially in the form of the metal and/or oxide and/or sulphide.

The catalyst can be prepared by any method which is known in the art. Advantageously, it is obtained by mixing the matrix and the zeolite then forming the mixture. The hydrogenating element is introduced during mixing, or preferably after forming.

Forming can be carried out by extrusion, pelletization, by the oil drop method, by rotating plate granulation or using any other method which is well known to the skilled person. Forming is followed by calcining; the hydrogenating element is introduced before or after calcinin. The preparation is completed by calcining at a temperature of 250° C. to 600° C.

One preferred method of the present invention consists of mixing the IM-5 zeolite powder in a moist alumina gel for several tens of minutes, then passing the paste obtained through a die to form extrudates with a diameter in the range 0.4 to 4 mm.

The hydrogenating function can be introduced in part only (for example in the case of combinations of oxides of group VIB and VIII metals) or in its entirety on mixing the zeolite, i.e., the IM-5 zeolite, with the gel of the oxide selected as the matrix.

The hydrogenating function can also be introduced by one or more ion exchange operations carried out on the calcined support constituted by an IM-5 zeolite, dispersed in the selected matrix, using solutions containing precursor salts of the selected metals.

The hydrogenating function can also be introduced by one or more operations for impregnating the formed and calcined support, using a solution containing at least one precursor of at least one oxide of at least one metal selected from the group formed by group VIII metals and group VIB metals, the precursor(s) of at least one oxide of at least one group VIII metal preferably being introduced after those of group VIB or at the same time as the latter, if the catalysts contain at least one group VIB metal and at least one group VIII metal.

When the catalyst contains at least one group VIB element, for example molybdenum, it is possible, for example, to impregnate the catalyst with a solution containing at least one group VIB element, dry then calcine. Molybdenum impregnation can be facilitated by adding phosphoric acid to solutions of ammonium paramolybdate, which thus also introduces the phosphorous function to promote the catalytic activity.

In a preferred implementation of the invention, the catalyst contains, as a promoter, at least one element selected from silicon, boron and phosphorous. These elements are introduced into a support already containing at least one IM-5 zeolite, at least one matrix as defined above, and preferably also containing at least one metal selected from the group formed by group VIB and group VIII metals.

When the catalyst contains boron and/or silicon and/or phosphorous and optionally an element selected from group VIIA, halogen ions, optionally at least one element selected from group VIIB and optionally at least one element selected from group VB, these elements can also be introduced into the catalyst at various stages of the preparation and in various manners.

The matrix is preferably impregnated using the "dry" impregnation method which is well known to the skilled person. Impregnation can be carried out in a single step using a solution containing all of the constituent elements of the final catalyst.

The P, B, Si and the element selected from group VIIA halide ions can be introduced into the calcined precursor by one or more impregnation operations using an excess of solution.

When the catalyst contains boron, one preferred method of the invention consists of preparing an aqueous solution of at least one boron salt such as ammonium biborate or ammonium pentaborate in an alkaline medium and in the presence of hydrogen peroxide and carrying out dry impregnation, in which the pore volume of the precursor is filled with the solution containing boron.

When the catalyst contains silicon, a silicone type silicon compound is used.

When the catalyst contained boron and silicon, the boron and silicon can also be deposited simultaneously using a solution containing a boron salt and a silicone type silicon compound. Thus where the precursor is a nickel-molybdenum type catalyst supported on a support containing alumina and IM-5 zeolite, for example, it is possible to impregnate this precursor with an aqueous solution of ammonium biborate and Rhodorsil ELP silicone from Rhône Poulenc, to dry at 80° C., for example, impregnate with an ammonium fluoride Solution, then dry at 80° C., for example, followed by calcining, preferably in air in a traversed bed, for example at 500° C. for 4 hours.

When the catalyst contains at least one group VIIA element, preferably fluorine, it is possible to impregnate the catalyst with an ammonium fluoride solution, to dry at 80° C. for example, followed by calcining, preferably in air in a traversed bed, for example at 500° C. for 4 hours.

Other impregnation sequences can be used to obtain the catalyst of the invention.

When the catalyst contains phosphorous, it is possible to impregnate the catalyst with a solution containing phosphorous, to dry, then to calcine.

When the elements contained in the catalyst, i.e., at least one metal selected from the group formed by group VIII and group VIB metals, optionally boron, silicon, phosphorous, at least one group VIIA element, at least one group VIIB element, at least one group VB element, are introduced in a number of steps for impregnating the corresponding precursor salts, an intermediate step for drying the catalyst is generally carried out at a temperature which is generally in the range 60° C. to 250° C. and an intermediate catalyst calcining step is generally carried out at a temperature in the range 250° C. to 600° C.

To finish the catalyst preparation, the moist solid is left in a moist atmosphere at a temperature in the range 10° C. to 80° C., then the moist solid obtained is dried at a temperature in the range 60° C. to 1 50° C., and finally the solid obtained is calcined at a temperature in the range 150° C. to 800° C.

A preparation process consists of carrying out the following operations:

a) preparing a solid termed the precursor, comprising at least the following compounds: at least one matrix, at least one IM-5 zeolite, optionally at least one element selected from the group formed by group VIB and group VIII elements, optionally at least one promoter element selected from the group boron and silicon, optionally phosphorous, and optionally at least one group VIIA element, the whole preferably having been formed;

b) calcining the dry solid obtained in step a) at a temperature of at least 150° C.;

c) if necessary, impregnating the solid precursor obtained from step b) with at least one solution containing at least one element from group VIIB, VB, VIII, VIB or VIIA;

d) leaving the moist solid in a moist atmosphere at a temperature in the range 10° C. to 120° C.;

e) drying the moist solid obtained in step d) at a temperature in the range 60° C. to 150° C.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate. ammonium heptamolybdate, ammonium tungstate, phosphomolybdic acid, phospliotunostic acid and their salts, silicomolybdic acid, silicotungstic acid and their salts. Preferably, oxides and ammonium salt are used, such as ammonium molybdate, ammonium heptamolybdate and ammonium tungstate.

The sources of the group VIII elements which can be used are well known to the skilled person. Examples of sources of non noble metals are nitrates, sulphates, phosphates, halides, for example chlorides, bromides and fluorides, and carboxylates, for example acetates and carbonates. Examples of sources of noble metals are halides, for example chlorides, nitrates, acids such as chloroplatinic acid, and oxychlorides such as ammoniacal ruthenium oxychloride.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

A variety of silicon sources can be used. Examples are ethyl orthosilicate $Si(OEt)_4$, siloxanes, polysiloxanes, silicones and halogenated silicates such as ammonium fluorosilicate $(NH_4)_2SiF_6$ or sodium fluorosilicate $Na_2SiF_6$.

Silicomolybdic acid and its salts, and silicotungstic acid and its salts can also advantageously be used. Silicon can be added, for example, by impregnation using ethyl silicate in solution in a water/alcohol mixture. Silicon can also be added, for example, by impregnation using a silicone type silicon compound suspended in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinlolines, and pyrrole group compounds. Boron can, for example, be introduced using a solution of boric acid in a water/alcohol mixture.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating an aqueous hydrofluoride solution or ammonium fluoride.

Sources of group VIIB elements which can be used are well known to the skilled person. Preferably, ammonium salts, nitrates and chlorides are used.

Sources of the group VB element which can be used are well known to the skilled person. Examples of niobium sources are oxides such as diniobium pentoxide $Nb_2O_5$, niobic acid $Nb_2O_5.H_2O$, niobium hydroxides and polyoxoniobates, niobium alkoxides with formula $Nb(OR_1)_3$ where $R_1$ is an alkyl radical, niobium oxalate $NbO(HC_2O_4)_5$, and ammonium niobate. Preferably, niobium oxalate or ammonium niobate are used.

Niobium impregnation can be facilitated by adding oxalic acid and optionally ammonium oxalate to niobium oxalate solutions. Other compounds can be used to improve Solubility and facilitate niobium impregnation, as is well known to the skilled person.

At least part of the catalysts obtained, which are in the oxide form, can be placed in the metallic or sulphide form.

The catalysts obtained in the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, *J. Am. Chem. Soc.*, vol. 60, 309–316 (1938)) and is in the range 50 to 600 m$^2$/g, the pore volume measured using a mercury porisimeter is in the range 0.2 to 1.5 cm$^3$/g and the pore size distribution may be unimodal, bimodal or polymodal.

The catalysts obtained in the present invention are used for hydrocracking hydrocarbon feeds such as petroleum cuts. The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal or catalytic conversion processes, and their mixtures. They contain heteroatoms Such as sulphur, oxygen and nitrogen and possibly metals.

The catalysts obtained are advantageously used for hydrocracking, in particular of vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight.

The catalyst of the present invention can advantageously be used for hydrocracking vacuum distillate type cuts which are highly charged with sulphur and nitrogen.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature, i.e., either in the reactor or ex-situ.

One conventional sulphurisation method which is well known to the skilled person consists of heating in the presence of hydrogen sulphide (pure or, for example, in a stream of a hydrogen/hydrogen sulphide mixture or a nitrogen/hydrogen sulphide mixture) to a temperature in the range 150° C. to 800° C., preferably in the range 250° C. to 600° C., generally in a traversed bed reaction zone.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The quantity of hydrogen is a minimum of 50 litres of hydrogen per litre of feed and usually in the range 80 to 5000 litres of hydrogen per litre of feed. The hourly space velocity is generally in the range 0.1 to 20 volumes of feed per volume of catalyst per hour.

In a first implementation, or partial hydrocracking, also known as mild hydrocracking, the degree of conversion is below 55%. The catalyst of the invention is thus used at a temperature which is generally 230° C. or more, preferably 300° C., generally at most 480° C., and usually in the range 350° C. to 450° C. The pressure is generally over 2 MPa and preferably 3 MPa, less than 12 MPa and preferably less than 10 MPa. The quantity of hydrogen is a minimum of 100 normal litres of hydrogen per litre of feed and usually in the range 200 to 3000 normal litres of hydrogen per litre of feed. The hourly space velocity is generally in the range 0.1 to 10 $h^{-1}$. Under these conditions, the catalysts of the present invention have better activities for conversion, hydrodesulphuration and hydrodenitrogenation than commercially available catalysts.

In a second implementation, the process is carried out in two steps, the catalyst of the present invention being used for partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step can be any hydrotreatment catalyst which is known in the art. This hydrotreatment catalyst advantageously comprises a matrix, preferably alumina-based, and at least one metal with a hydrogenating function. The hydrotreatment function is ensured by at least one metal or metal compound, used alone in combination, selected from group VIII and group VIB metals, such as nickel, cobalt, molybdenum or tungsten in particular. Further, this catalyst can optionally contain phosphorous and optionally boron.

The first step is generally carried out at a temperature of 350–460° C., preferably 360–450° C.; the pressure is at least 2 MPa, preferably at least 3 MPa; and the hourly space velocity is 0.1–5 $h^{-1}$, preferably 0.2–2 $h^{-1}$, with a quantity of hydrogen at least 100 Nl/Nl of feed, preferably 60–3000 Nl/Nl of feed.

In the conversion step using the catalyst of the invention (or second hydrocracking step), the temperatures are generally 230° C. or more and usually in the range 300° C. to 480° C., preferably in the range 330° C. to 450° C. The pressure is generally at least 2 MPa, preferably at least 3 MPa; it is less than 12 MPa and preferably less than 10 MPa. The quantity of hydrogen is a minimum of 100 l/l of feed and usually in the range 200 to 3000 l/l of feed.

The hourly space velocity is generally in the range 0.15 to 10 $h^{-1}$. Under these conditions, the catalysts of the present invention have better activities for conversion, hydrodesulphuration, and hydrodenitrogenation and a better selectivity for middle distillates than commercially available catalysts. The service life of the catalysts is also improved in the moderate pressure range.

In a further implementation carried out in two steps, the catalyst of the present invention can be used for hydrocracking under high hydrogen pressure conditions of at least 5 MPa. The treated cuts are, for example, vacuum distillates containing high sulphur and nitrogen contents which have already been hydrotreated. In this hydrocracking mode, the degree of conversion is over 55%. In this case, the petroleum cut conversion process is carried out in two step, the catalyst of the invention being used in the second step.

The catalyst of the first step can be any hydrotreatment catalyst which is known in the art. This hydrotreatment catalyst advantageously comprises a matrix, preferably alumina-based. and at least one metal with a hydrogenating function. The hydrogenating function is ensured by at least one metal or metal compound, used alone or in combination, selected from group VIII and group VI13 metals, such as nickel, cobalt, molybdenum and tungsten in particular. Further, this catalyst can optionally contain phosphorous and optionally boron.

The first step is generally carried out at a temperature of 350–460° C., preferably 360–450° C.; the pressure is over 3 MPa; the hourly space velocity is 0.1–5 $h^{-1}$, preferably 0.2–2 $h^{-1}$; and the quantity of hydrogen is at least 100 Nl/Nl of feed, preferably 260–3000 Nl/Nl of feed.

For the conversion step using the catalyst of the invention (or second step), the temperatures are generally 230° C. or more, usually in the range 300° C. to 480° C., preferably in the range 300° C. to 440° C. The pressure is generally over 5 MPa, preferably over 7 MPa. The quantity of hydrogen is a minimum of 100 l/l of feed, usually in the range 200 to 3000 l/l of hydrogen per litre of feed. The hourly space velocity is generally in the range 0.15 to 10 $h^{-1}$.

Under these conditions, the catalysts of the present invention have better activity for conversion and better selectivity for middle distillates than for commercially available catalysts, even though the zeolite contents are considerably lower than those of commercially available catalysts.

The following examples illustrate the present invention without in any way limiting its scope.

EXAMPLE 1

Preparation of a Hydrocracking Catalyst Support Containing an IM-5 Zeolite

The IM-5 zeolite used in this example was that the preparation for which is described in Example 1 of French patent FR-A-2 754 809.

The product obtained above was calcined in nitrogen for 24 hours at 550° C.; this step was immediately followed by a second calcining step carried out in air at 450° C., for 24 hours.

The substance obtained was then left in contact with an aqueous 1 mole solution of ammonium chloride for 2 hours at ambient temperature using 50 ml of solution per gram of calcined solid product. The substance was then filtered, washed with deionised water and dried at 110° C. This treatment was repeated three times. The substance was calcined in air for 24 hours at 550° C. The calcined product was analysed by X ray diffraction. The X ray diffraction diagram obtained was in agreement with Table 2.

Atomic emission spectroscopic analysis of the Si, Al and Na in the product gave the following molar composition:

$$100SiO_2:3.9Al_2O_3:0.008Na_2O$$

A hydrocracking catalyst support containing the IM-5 zeolite produced as above was obtained as follows. 15.3 g of IM-5 zeolite was mixed with 84.7 g of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then mixed for 15 minutes. After mixing, the paste obtained was passed through a die with cylindrical 1.4 mm diameter orifices. The extrudates were then dried overnight at 120° C. in air and calcined at 550° C. in air.

EXAMPLE 2

Preparation of Hydrocracking Catalysts Containing an IM-5 Zeolite with Molybdenum (Table 3)

IM-5 Mo Catalyst

Extrudates of the support containing an IM-5 zeolite prepared in Example 1 were dry impregnated with an aqueous solution of ammonium heptamolybdate, dried overnight at 120° C. in air and finally calcined at 550° C. in air. The oxide weight contents of the IM-5 Mo catalyst obtained are shown in Table 3.

IM-5 MoB Catalyst

The IM-5 Mo catalyst was then impregnated with an aqueous solution comprising ammonium biborate to deposit 1.6% by weight of $B_2O_3$. After ageing at ambient temperature in a water-saturated atmosphere, the impregnated extrudates were dried overnight at 120° C. then calcined at 550° C. for 2 hours in dry air. A catalyst designated IM-5 MoB was obtained.

IM-5 MoSi Catalyst

In the same manner, an IM-5 MoSi catalyst was prepared by impregnating the IM-5 Mo catalyst with a Rhodorsil EP1 (Rhone-Poulenc) silicone emulsion so as to deposit about 2.0% $SiO_2$. The impregnated extrudates were then dried overnight at 120° C. and calcined at 550° C. for 2 hours in dry air.

IM-5 MoBSi Catalyst

Finally, an IM-5 MoBSi catalyst was obtained by impregnating the IM-5 Mo catalyst with an aqueous solution comprising ammonium biborate and Rhodorsil EP1 (Rhone-Poulenc) silicone emulsion. The impregnated extrtidates were then dried overnight at 120° C. and calcined at 550° C. for 2 hours in dry air.

EXAMPLE 3

Preparation of Hydrocracking Catalysts Containing an IM-5 Zeolite with Nickel and Molybdenum (Table 4)

IM-5 NiMo Catalyst

Extrudates of the support containing an IM-5 zeolite as prepared in Example 1 were dry impregnated with an aqueous solution of a mixture of ammonium heptamolybdate and nickel nitrate, dried overnight at 120° C. and finally calcined at 550° C. in air. The oxide weight contents of the IM-5 NiMo catalyst obtained are shown in Table 4.

IM-5 NiMoP Catalyst

The extrudates were dry impregnated with an aqueous solution comprising a mixture of ammonium heptamolybdate, nickel nitrate and orthophosphoric acid, dried overnight at 120° C. then calcined at 550° C. for 2 hours in air.

IM-5 NiMoPB Catalyst

The IM-5 NiMoP catalyst was then impregnated with an aqueous solution comprising ammonium biborate. After ageing at ambient temperature in a water-saturated atmosphere, the impregnated extrudates were dried overnight at 120° C. then calcined at 550° C. for 2 hours in dry air. A catalyst designated IM-5 NiMoPB was obtained.

IM-5 NiMoPSi Catalyst

AN IM-5 NiMoPSi catalyst was prepared using the same procedure as the IM-5NiMoPB catalyst above but replacing the boron precursor impregnation solution with a Rhodorgil FP1 silicone emulsion.

IM-5 NiMoPBSi Catalyst

Finally, an IM-5 NiMoPBSi catalyst was obtained using the same procedure as for the catalysts above but using an aqueous solution comprising ammonium biborate and Rhodorsil EP1 silicone emulsion. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst IM-5 NiMoPBSiF was obtained.

TABLE 3

Characteristics of IM-5 + Mo + promoter catalysts

| Catalyst | IM-5 Mo | Im-5 MoB | IM-5 MoSi | IM-5 MoBSi |
|---|---|---|---|---|
| $MoO_3$ (wt %) | 14.1 | 14.6 | 14.3 | 14.2 |
| $B_2O_3$ (wt %) | 0 | 1.45 | 0 | 1.4 |
| $SiO_2$ (wt %) | 12.2 | 11.9 | 13.6 | 13.7 |
| Complement to 100%, mainly composed of $Al_2O_3$ (wt %) | 73.7 | 72.05 | 72.1 | 70.7 |

TABLE 4

Characteristics of IM-5 + NiMo + promoter + optional GVIIA

| Catalyst | IM-5 NiMo | IM-5 NiMoP | IM-5 NiMoPB | IM-5 NiMoPSi | IM-5 NiMo-PBSi | IM-5 NiMo-PBSiF |
|---|---|---|---|---|---|---|
| $MoO_3$ (wt %) | 13.6 | 13.5 | 12.9 | 13.1 | 12.9 | 12.9 |
| NiO (wt %) | 2.95 | 2.1 | 3.0 | 3.05 | 2.9 | 2.85 |
| $P_2O_5$ (wt %) | 0 | 4.55 | 4.5 | 4.4 | 4.6 | 4.5 |
| $B_2O_3$ (wt %) | 0 | 0 | 1.55 | 0 | 1.6 | 1.5 |
| $SiO_2$ (wt %) | 11.8 | 11.3 | 11.1 | 13.3 | 12.7 | 12.5 |
| F (wt %) | 0 | 0 | 0 | 0 | 0 | 1.1 |
| Complement to 100% mainly composed of $Al_2O_3$ (wt %) | 71.65 | 68.55 | 66.95 | 66.15 | 65.3 | 64.65 |

EXAMPLE 4

Preparation of Catalysts with G VIIB (Table 5)

IM-5 NiMoPMn Catalyst

The IM-5 NiMoP catalyst was then impregnated with an aqueous solution comprising manganese nitrate. After ageing at ambient temperature in a water-saturated atmosphere, the impregnated extrudates were dried overnight at 120° C. then calcined at 550° C. for 2 hours in dry air. A catalyst designated IM-5 NiMoPMn was obtained.

IM-5 NiMoPMnBSi Catalyst

This catalyst was then obtained by impregnating it with an aqueous solution comprising ammonium biborate and Rhodorsil EP1 (Rhone-Poulenc) silicone emulsion. The impregnated extrudates were then dried overnight at 120° C. and calcined at 550° C. for 2 hours in dry air to obtain the catalyst IM-5 NiMoPMnBSi.

IM-5 NiMoPMnBSiF

Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst IM-5 NiMoPMnBSiF was obtained. The weight contents of these catalysts are shown in Table 5.

TABLE 5

Characteristics of IM-5 NiMo catalysts containing manganese

| Catalyst | IM-5 NiMoPMn | IM-5 NiMoPMnBSi | IM-5 NiMoPMnBSiF |
|---|---|---|---|
| $MoO_3$ (wt %) | 12.8 | 12.2 | 12.5 |
| NiO (wt %) | 3.05 | 2.7 | 2.9 |
| $MnO_2$ (wt %) | 2.2 | 1.9 | 2.1 |
| $P_2O_5$ (wt %) | 4.7 | 4.8 | 4.4 |
| $B_2O_3$ (wt %) | 0 | 1.4 | 1.3 |
| $SiO_2$ (wt %) | 11.0 | 12.6 | 12.4 |
| F (wt %) | 0 | 0 | 1.0 |
| Complement to 100% mainly composed of $Al_2O_3$ (wt %) | 66.25 | 64.4 | 63.4 |

Analysis of catalysts IM-5 NiMoPSi, IM-5 NiMoPBSi, IM-5 NiMoPBSiF (Table 4) and catalysts IM-5 NiMoPMnBSi, IM-5 NiMoPMnBSiF (Table 5) using an electron microprobe showed that the silicon added to the catalyst of the invention was principally located on the matrix and was in the form of amorphous silica.

EXAMPLE 5

Preparation of a Support Containing an IM-5 Zeolite and a Silica-Alumina

We produced a silica-alumina powder by co-precipitation with a composition of 2% $SiO_2$ and 98% $Al_2O_3$. A hydrocracking catalyst support containing this silica-alumina and the IM-5 zeolite of Example 1 was then produced. To this end we used 18.5% by weight of the IM-5 zeolite of Example 1 which was mixed with 81.5% by weight of a matrix composed of the silica-alumina prepared as above.

This powdered mixture was then mixed with an aqueous solution containing 66% nitric acid (7% by weight of acid per gram of dry gel) and mixed for 15 minutes. After mixing, the paste obtained was passed through a die with cylindrical 1.4 mm diameter orifices. The extrudates were then dried overnight at 120° C. and calcined at 550° C. for 2 hours in air.

EXAMPLE 6

Preparation of Hydrocracking Catalysts Containing an IM-5 zeolite and a Silica-Alumina Extrudates of the support containing a silica-alumina and an IM-5 zeolite prepared in Example 5 were dry impregnated with an aqueous solution of a mixture of ammonium heptamolybdate, nickel nitrate and orthophosphoric acid, dried overnight at 120° C. and finally calcined at 550° C. in air. The oxide weight contents of the IM-5-SiAl—NiMoP catalyst obtained are shown in Table 6.

We impregnated the sample of catalyst IM-5-SiAl—NiMoP with an aqueous solution comprising ammonium biborate so as to impregnate with 1.5% by weight of $B_2O_3$. After ageing at ambient temperature in a water-saturated atmosphere, the impregnated extrudates were dried overnight at 120° C. then calcined at 550° C. for 2 hours in dry air. A catalyst designated IM-5-SIA—NiMoPB which thus contained silicon in a silica-alumina matrix, was obtained.

The characteristics of the IM-5-SiAl-NiMo catalysts are summarised in Table 6.

TABLE 6

Characteristics of IM-5-SiAl-NiMo catalysts

| Catalyst | IM-5-SiAl NiMoP | IM-5-SiAl NiMoPB |
|---|---|---|
| $MoO_3$ (wt %) | 13.4 | 13.1 |
| NiO (wt %) | 2.8 | 2.9 |
| $P_2O_5$ (wt %) | 4.6 | 4.8 |
| $B_2O_3$ (wt %) | 0 | 1.3 |
| $SiO_2$ (wt %) | 14.9 | 14.6 |
| Complement to 100% mainly composed of $Al_2O_3$ (wt %) | 64.3 | 63.3 |

EXAMPLE 7

Preparation of a Support Containing a Y Zeolite (comparative example)

A large quantity of a hydrocracking catalyst support containing a Y zeolite was produced so as to be able to prepare different catalysts based on the same support. To this end, 20.5% by weight of a dealuminated Y zeolite with a lattice parameter of 2.429 nm, an overall $SiO_2/Al_2O_3$ ratio of 30.4 and a $SiO_2/Al_2O_3$ framework ratio of 58 was mixed with 79.5% by weight of a matrix composed of ultrafine tabular boehmite or alumina gel sold by Condéa Chemie GmbH under the reference SB3. This powdered mixture was then mixed with an aqueous solution containing 66% nitric acid (7% by weight of acid per gram of dry gel) and mixed for 15 minutes. After mixing, the paste obtained was passed through a die with cylindrical 1.4 mm diameter orifices. The extrudates were then dried overnight at 120° C. and calcined at 550° C. for 2 hours in air containing 7.5% by volume of water. Cylindrical extrudates 1.2 mm in diameter were obtained, with a specific surface area of 223 $m^2/g$ and a unimodal pore distribution centred on 10 nm. Analysis of the matrix by X ray diffraction revealed that it was composed of cubic gamma alumina of low crystallinity and dealuminated Y zeolite.

EXAMPLE 8

Preparation of Hydrocracking Catalysts Containing a Y Zeolite (not in accordance with the invention)

Extrudates of the support containing a dealuminated Y zeolite prepared in Example 7 were dry impregnated with an aqueous solution of a mixture of ammonium heptamolybdate and nickel nitrate, dried overnight at 120° C. in air and finally calcinced at 550° C. in air. The oxide weight contents of the YNiMo catalyst obtained are shown in Table 7. The final YNiMo catalyst obtained contained 16.3% by weight of Y zeolite with a lattice parameter of 2.429 nm, an overall $SiO_2/Al_2O_3$ ratio of 30.4 and a framework $SiO_2/Al_2O_3$ ratio of 58.

The extrudates of Example 7 were impregnated as above but using orthophosphoric acid in addition, and treated in the same manner as described above to obtain catalyst YNiMoP.

We impregnated a sample of catalyst YNiMoP with an aqueous solution comprising ammonium biborate. After ageing at ambient temperature in a water-saturated atmosphere, the impregnated extrudates were dried overnight at 120° C. then calcined at 550° C. for 2 hours in dry air. A catalyst designated NiMoP/Y-alumina doped with boron.

A YniMoPSi catalyst was obtained using the same procedure as for the catalyst YNiMoPB above, replacing the boron precursor with a Rhodorsil EP1 (Rhone-Poulenc) silicone emulsion in the impregnating solution.

Finally, a YNiMoPBSi catalyst was obtained by impregnating a catalyst with an aqueous solution comprising ammonium biborate and Rodorsil EP1 (Rhone-Poulenc) silicone emulsion. The other steps of the procedure were the same as those indicated above. The characteristics of catalysts YNiMo are summarised in Table 7.

TABLE 7

Characteristics of Y NiMo catalysts (comparative)

| Catalyst | YNiMo | YNiMoP | YNiMoPB | YNiMoPSi | YNiMo-PBSi |
|---|---|---|---|---|---|
| $MoO_3$ (wt %) | 13.5 | 12.9 | 12.7 | 12.7 | 12.5 |
| NiO (wt %) | 3.1 | 3.0 | 2.9 | 2.9 | 2.8 |
| $P_2O_5$ (wt %) | 0 | 4.4 | 4.3 | 4.3 | 4.2 |
| $B_2O_3$ (wt %) | 0 | 0 | 1.8 | 0 | 1.8 |
| $SiO_2$ (wt %) | 16.2 | 15.4 | 15.2 | 17.0 | 16.7 |
| Complement to 100% mainly composed of $Al_2O_3$ (wt %) | 67.2 | 64.3 | 63.1 | 63.1 | 62.0 |

Electron microprobe analysis of catalysts YNiMoPSi, YNiMoPBSi (Table 7) showed that the silicon added to the catalyst of the invention was principally located on the matrix and was in the form of amorphous silica.

EXAMPLE 9

Comparison of Catalysts for Partial Conversion Hydrocracking of a Vacuum Gas Oil The catalysts prepared as described above were employed under moderate pressure hydrocracking conditions using a petroleum feed with the following principal characteristics:

| Density (20/4) | 0.921 |
|---|---|
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. The catalyst for the first hydrotreatment step of the process, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| | |
|---|---|
| Total pressure | 5 MPa |
| Hydrotreatment catalyst | 40 cm$^3$ |
| Hydrocracking catalyst | 40 cm$^3$ |
| Temperature | 400° C. |
| Hydrogen flow rate | 20 l/h |
| Feed flow rate | 40 cm$^3$/h |

The two catalysts underwent in-situ sulphurisation before the reaction. It should be noted that any in-situ or ex-situ sulphurisation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C.$^{minus}$ of effluent.

380° C.$^{minus}$ represents the fraction distilled at a temperature of 380° C. or less.

The gross selectivity GS for middle distillates is taken to be:

GS=100*weight of (150° C.–380° C.) fraction/weight of 380° C.$^{minus}$ fraction of effluent.

The hydrodesulphuration conversion HDS is taken to be:

HDS=(S$_{initial}$–S$_{effluent}$)/S$_{initial}$*100=(24600–S$_{effluent}$)/24600*100

The hydrodenitrogenation conversion HDN is taken to be:

HDN=(N$_{initial}$–N$_{effluent}$)/N$_{initial}$*100=(1130–N$_{effluent}$)/1130*100

The following table shows the gross conversion GC at 400° C., the gross selectivity GS, the hydrodesulphuration conversion HDS and the hydrodenitrogenation conversion HDN for the catalysts.

TABLE 8

Catalytic activities of catalysts for partial hydrocracking at 400° C.

| | GC (wt %) | GS (%) | HDS (%) | HDN (%) |
|---|---|---|---|---|
| NiMoP/Y | 48.7 | 80.3 | 99.43 | 96.6 |
| NiMoPB/Y | 49.3 | 80.4 | 99.57 | 97.4 |
| NiMoPSi/Y | 49.5 | 78.9 | 99.85 | 98.3 |
| NiMoP/IM-5-SiAl | 50.2 | 60.3 | 98.6 | 96.5 |
| NiMoPB/IM-5SiAl | 50.6 | 59.7 | 98.5 | 97.4 |
| NiMo/IM-5 | 50.1 | 60.2 | 98.6 | 94.9 |
| NiMoP/IM-5 | 50.2 | 60.9 | 99.4 | 96.3 |
| NiMoPB/IM-5 | 50.6 | 60.8 | 99.5 | 97.2 |

TABLE 8-continued

Catalytic activities of catalysts for partial hydrocracking at 400° C.

| | GC (wt %) | GS (%) | HDS (%) | HDN (%) |
|---|---|---|---|---|
| NiMoPSi/IM-5 | 50.9 | 60.5 | 99.5 | 98.1 |
| NiMoPBSi/IM-5 | 51.4 | 60.6 | 99.6 | 98.5 |

The results of Table 8 show that the use of a catalyst of the invention containing an IM-5 zeolite is more active than prior art catalysts and that adding at least one element selected from the group formed by B, Si and P improves the performances of the catalyst for conversion. The catalysts of the invention containing boron and silicon are thus of particular interest for partial hydrocracking of a vacuum distillate type feed containing nitrogen at medium hydrogen pressure.

Further, the results of Table 8 show that introducing the silicon onto the prepared catalyst (IM-5 NiMo series), rather than in the form of a support containing silicon obtained from a silica-alumina (IM-5-SiAl—NiMo series), is advantageous. Thus introducing the silicon to a precursor already containing the group VIB and/or VIII elements and optionally at least one of elements P, B and F is particularly advantageous.

EXAMPLE 10

Comparison of Hydrocracking Catalysts for High Conversion Hydrocracking of a Vacuum Gas Oil The catalysts prepared as described above were used under high conversion (60–100%) hydrocracking conditions. The petroleum feed was a hydrotreated vacuum distillate with the following principal characteristics:

| | |
|---|---|
| Density (20/4) | 0.869 |
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a catalyst comprising a group VIB element (Mo) and a group VIII element (Ni) deposited on alumina.

0.6% by weight of aniline and 2% by weight of dimethyldisulphide were added to the feed to simulate the partial pressures of H$_2$S and NH$_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+aniline mixture at 320° C. It should be noted that any in-situ or ex-situ sulphurisation method is suitable.

Once sulphurisation had been carried out, the feed described above could be transformed. The operating conditions of the test unit were as follows:

| | |
|---|---|
| Total pressure | 9 MPa |
| Catalyst | 80 cm³ |
| Temperature | 360–420° C. |
| Hydrogen flow rate | 80 l/h |
| Feed flow rate | 80 cm³/h |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100*weight of(150° C.–380° C.) fraction/weight of 380° C.$^{minus}$ fraction of effluent.

The (27–150) gasoline yield (hereinafter Gyld) was equal to the weight % of compounds with a boiling point in the range 27° C. to 150° C. in the effluents. The jet fuel yield (kerosine, 150–250) (hereinafter Kyld) was equal to the weight % of compounds with a boiling point in the range 150° C. to 250° C. in the effluents. The (250–380) gas oil yield was equal to the weight % of compounds with a boiling point in the range 250° C. to 380° C. in the effluents.

The reaction temperature was fixed so as to obtain a gross conversion GC of 70% by weight. Table 9 below shows the reaction temperature and gross selectivity for the catalysts described in Tables 3, 4 and 5.

TABLE 9

Catalytic activities for high conversion hydrocracking (70%)

| | T (° C.) | Gasoline yield (wt %) | Kerosine yield (wt %) |
|---|---|---|---|
| NiMo/Y | 375 | 20.5 | 24.1 |
| NiMoP/Y | 374 | 21.2 | 24.7 |
| NiMoPB/Y | 374 | 20.7 | 23.6 |
| NiMoPSi/Y | 374 | 19.9 | 23.1 |
| Mo/IM-5 | 372 | 37.3 | 12.2 |
| MoB/IM-5 | 372 | 37.5 | 12.6 |
| MoSi/IM-5 | 371 | 37.1 | 12.1 |
| MoBSi/IM-5 | 370 | 36.9 | 12.0 |
| NiMo/IM-5 | 372 | 38.3 | 12.0 |
| NiMoP/IM-5 | 372 | 38.1 | 13.1 |
| NiMoPB/IM-5 | 370 | 38.0 | 12.4 |
| NiMoPSi/IM-5 | 370 | 38.5 | 12.8 |
| NiMoPBSi/IM-5 | 369 | 37.8 | 12.6 |
| NiMoPBSiF/IM-5 | 366 | 37.5 | 13.3 |
| NiMoPMn/IM-5 | 370 | 37.4 | 12.8 |
| NiMoPMnBSi/IM-5 | 369 | 37.0 | 12.5 |
| NiMoPMnBSiF/IM-5 | 366 | 36.9 | 12.3 |

Table 9 shows that using a catalyst of the invention containing IM-5 zeolite leads to higher conversions (i.e., lower conversion temperatures for a given conversion of 70% by weight) than catalysts which are not in accordance with the invention. Further, adding at least one element selected from the group formed by P, B and Si to the catalysts of the invention also leads to an increase in activity. It can also be seen that the presence of manganese or fluorine improves the activity. Further, the catalysts of the invention lead to improved gasoline yields with respect to those recorded for the prior art catalysts.

In general, adding at least one element selected from the group formed by P, B, Si, VIIB, VIIA to the catalyst containing IM-5 zeolite and the group VIB element improved the conversion activity, leading to a reduction in the reaction temperature required to achieve 70% conversion but tended to reduce the gross selectivity for gasoline and kerosine and in particular the gasoline selectivity, this still remaining substantially higher than that obtained with the prior art Y zeolite based catalysts.

EXAMPLE 11

Preparation of Hydrocracking Catalysts Containing an IM-5 Zeolite and Niobium

Extrudates of the support containing a Y zeolite prepared in Example 1 were dry impregnated with an aqueous solution of niobium oxalate Nb(HC$_2$O$_4$)$_5$, oxalic acid and ammonium oxalate. The aqueous solution containing niobium was prepared from 1330 ml of water in which 33 g of oxalic acid, 37.2 g of ammonium oxalate and 92.3 g of niobium oxalate had been dissolved.

To prepare the solution, the mixture of oxalic acid and ammonium oxalate was firstly dissolved and when the solution was clear, said solution was heated to 55° C. and niobium oxalate was added. The solution was made up to 1330 ml with water. The support containing an IM-5 zeolite prepared in Example 1 above was impregnated using an excess of solution. The 1330 ml of solution was brought into contact with 380 g of catalyst. This enabled about 5% by weight of niobium to be deposited on the catalyst After two hours, the extrudates were recovered. These were then dried overnight at 120° C. in a stream of dry air. The reference for the sample was Nb.

Extrudates of catalyst Nb containing an IM-5 zeolite and niobium were dry impregnated with an aqueous ammonium heptamolybdate solution, dried overnight at 120° C. in air and finally calcined in air at 550° C. The weight contents of the oxides of the NbMo catalyst obtained are shown in Table 10.

The NbMo catalyst was then impregnated with an aqueous solution comprising a Rhodorsil EP1 (Rhone Poulenc) silicone emulsion so as to deposit about 2.0% of SiO$_2$. The impregnated extrudates were then dried overnight at 120° C. and calcined at 550° C. for 2 hours in dry air. Catalyst NbMoSi was obtained.

Extrudates of catalyst Nb containing an IM-5 zeolite and niobium were dry impregnated with an aqueous solution of ammonium heptamolybdate and nickel nitrate, dried overnight at 120° C. in air and finally calcined in air at 550° C. The weight contents of the oxides of the NbNiMo catalyst obtained are shown in Table 10.

Extrudates of catalyst Nb containing an IM-5 zeolite and niobium were dry impregnated with an aqueous solution of ammonium heptamolybdate, nickel nitrate and orthophosphoric acid, dried overnight at 120° C. in air and finally calcined in air at 550° C. We then impregnated this sample of catalyst NbNiMoP with an aqueous solution comprising ammonium biborate and Rhodorsil EP1 silicone emulsion. After ageing at ambient temperature in a water-saturated atmosphere, the impregnated extrudates were dried overnight at 120° C. then calcined at 550° C. for 2 hours in dry air. A catalyst designated NiMoPBSi was obtained. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst NbNi- MoPBSiF was obtained. The final oxide contents of the catalysts thus prepared are shown in Table 10.

TABLE 10

Characteristics of catalysts containing an IM-5 zeolite and niobium

| Catalyst | NbMo | NbNiMo | NbNiMo-Si | NbNiMoPBSi | NbNiMoPBSiF |
|---|---|---|---|---|---|
| $Nb_2O_5$ (wt %) | 4.8 | 4.7 | 4.6 | 4.3 | 4.2 |
| $MoO_3$ (wt %) | 13.2 | 12.8 | 12.4 | 11.7 | 11.5 |
| NiO (wt %) | 0 | 2.95 | 2.87 | 2.7 | 2.7 |
| $P_2O_5$ (wt %) | 0 | 0 | 0 | 4.2 | 4.1 |
| $B_2O_3$ (wt %) | 0 | 0 | 0 | 1.7 | 1.7 |
| $SiO_2$ (wt %) | 11.6 | 11.3 | 13.2 | 12.5 | 12.3 |
| F (wt %) | 0 | 0 | 0 | 0 | 1.05 |
| Complement to 100% mainly composed of $Al_2O_3$ (wt %) | 70.1 | 68.1 | 66.2 | 62.5 | 61.5 |

EXAMPLE 12

Comparison of Catalysts for Partial Conversion Hydrocracking of a Vacuum Gas Oil The catalysts prepared in the above examples were employed under moderate pressure hydrocracking conditions using a petroleum feed with the following principal characteristics:

| | |
|---|---|
| Density (20/4) | 0.921 |
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. The catalyst for the first hydrotreatment step of the process, HTH548 from Procatalyse, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| | |
|---|---|
| Total pressure | 5 MPa |
| Hydrotreatment catalyst | 40 cm³ |
| Hydrocracking catalyst | 40 cm³ |
| Temperature | 400° C. |
| Hydrogen flow rate | 20 l/h |
| Feed flow rate | 40 cm³/h |

The two catalysts underwent in-situ sulphurisation before the reaction. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C.$^{minus}$ of effluent.

380° C.$^{minus}$ represents the fraction distilled at a temperature of 380° C. or less.

The gross selectivity GS for middle distillates is taken to be:

GS=100*weight of (150° C.–380° C.) fraction/weight of 380° C.$^{minus}$ fraction of effluent.

The hydrodesulphuration conversion HDS is taken to be:

HDS=($S_{initial}$–$S_{effluent}$)/$S_{initial}$*100=(24600–$S_{effluent}$)/24600*100

The hydrodenitrogenation conversion HDN is taken to be:

HDN=($N_{initial}$–$N_{effluent}$)/$N_{initial}$*100=(1130–$N_{effluent}$)/1130*100

The following table shows the gross conversion GC at 400° C., the gross selectivity GS, the hydrodesulphuration conversion HDS and the hydrodenitrogenation conversion HDN for the catalysts.

TABLE 11

Catalytic activities for catalysts comprising an IM-5 zeolite for partial hydrocracking at 400° C.

| | GC (wt %) | GS (%) | HDS (%) | HDN (%) |
|---|---|---|---|---|
| Mo | 48.3 | 61.2 | 96.5 | 91.2 |
| NbMo | 49.5 | 60.8 | 97.1 | 92.3 |
| NbNiMo | 50.4 | 60.0 | 98.8 | 95.6 |
| NbNiMoSi | 50.9 | 60.3 | 99.1 | 96.4 |
| NbNiMoPBSi | 51.9 | 60.3 | 99.7 | 98.9 |

The results of Table 11 show that the use of a catalyst of the invention containing an IM-5 zeolite and niobium resulted in high performances as regards selectivity and conversion. The gross selectivity for middle distillates was slightly reduced as a result of an increase in the degree of conversion, as is well known. Adding at least one element selected from the group formed by boron, silicon and phosphorous improved performances, especially conversion.

The catalysts of the invention are thus of particular importance for partial hydrocracking of a vacuum distillate type feed containing nitrogen at medium hydrogen pressure.

EXAMPLE 13

Comparison of Catalysts for High Conversion Hydrocracking of a Vacuum Gas Oil The catalysts prepared as described above were used under high conversion (60–100%) hydrocracking conditions. The petroleum feed was a hydrotreated vacuum distillate with the following principal characteristics:

| | |
|---|---|
| Density (20/4) | 0.869 |
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VIB element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+aniline mixture at 320° C. Once sulphurisation had been carried out, the feed described above could be transformed. The operating conditions of the test unit were as follows:

| | |
|---|---|
| Total pressure | 9 MPa |
| Catalyst | 80 cm³ |
| Temperature | 360–420° C. |
| Hydrogen flow rate | 80 l/h |
| Feed flow rate | 80 cm³/h |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100*weight of (150° C.–380° C.) fraction/weight of 380° C.$^{minus}$ fraction of effluent.

The (27–150) gasoline yield (hereinafter Gyld) was equal to the weight % of compounds with a boiling point in the range 27° C. to 150° C. in the effluents. The jet fuel yield (kerosine, 150–250) (hereinafter Kyld) was equal to the weight % of compounds with a boiling point in the range 150° C. to 250° C. in the effluents. The (250–380) gas oil yield was equal to the weight % of compounds with a boiling point in the range 250° C. to 380° C. in the effluents.

The reaction temperature was fixed so as to obtain a gross conversion GC of 70% by weight. Table 12 below shows the reaction temperature and gross selectivity for the catalysts described above.

TABLE 12

Catalytic activities for high conversion hydrocracking (70%) for catalysts comprising an IM-5 zeolite

| | T (° C.) | Gasoline yield (wt %) | Kerosine yield (wt %) |
|---|---|---|---|
| Mo | 372 | 37.3 | 12.2 |
| NbMo | 371 | 37.9 | 12.2 |
| NbNiMo | 370 | 38.6 | 12.4 |
| NbNiMoSi | 369 | 38.0 | 12.6 |
| NbNiMoPBSi | 367 | 38.3 | 12.9 |
| NbNiMoPBSiF | 365 | 38.1 | 13.6 |

Table 12 shows that using a catalyst of the invention containing IM-5 zeolite and niobium leads to high conversions. Further, these conversions are higher (i.e., lower conversion temperatures for a given conversion of 70% by weight) than those obtained with catalysts which are not in accordance with the invention containing no niobium. Further, adding at least one element selected from the group formed by phosphorous, boron and silicon to the catalysts of the invention also leads to an increase in activity.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French applications 99/02.334 and 99/02.335, are hereby incorporated by reference.

From the foregoing description, one skilled in the art can easily ascertain the essential characteristics of this invention, and without departing front the spirit and scope thereof, can make various changes and modifications of the invention to adapt it to various usages and conditions.

What is claimed is:

1. A process for hydrocracking a hydrocarbon-containing feed, in which the feed to be treated is brought into contact with a catalyst comprising at least one amorphous or low crystallinity oxide matrix, at least one IM-5 zeolite, at least one hydrodehydrogenating element, and at least one deposited promoter element selected from boron, silicon and phosphorus.

2. A hydrocracking process according to claim 1, in which the hydrodehydrogenating element is selected from the group formed by group VIB and group VIII elements.

3. A hydrocracking process according to claim 1, in which the catalyst comprises boron and silicon.

4. A hydrocracking process according to claim 1, in which the catalyst further comprises at least one group VIIA element.

5. A process according to claim 1, in which the catalyst further comprises at least one group VIIB element.

6. A process according to claim 1, in which the catalyst further comprises at least one group VB element.

7. A process according to claim 2, in which the group VIB element is molybdenum or tungsten and the group VIII element is iron, cobalt or nickel.

8. A process according to claim 1, in which the catalyst comprises, in % by weight with respect to the total catalyst mass:

0.1 to 99.8% of at least one IM-5 zeolite,
0.1 to 99% of at least one porous amorphous or low crystallinity oxide mineral matrix;

0.1 to 60% of at least one element that is selected from group VIB and group VIII elements;

0 to 60% of at least one group VB element;

up to 20% of at least one promoter element selected from the group formed by silicon, boron and phosphorus, not including any silicon contained in the IM-5 zeolite;

0 to 20% of at least one element selected from group VIIA;

0 to 60% of at least one element selected from group VIIB.

9. A process according to claim 1, in which the matrix for the catalyst is selected from the group consisting of alumina, silica, silica-alumina, clays, magnesia, titanium, oxide, boron oxide, zirconia, aluminum phosphates, titanium phosphates, zirconium phosphates, carbon and aluminates.

10. A process according to claim 2, in which the catalyst is prepared using the following method:

a) a solid termed the precursor is prepared, comprising at least the following compounds: at least one matrix, at least one IM-5 zeolite, at least one element selected from group VIB and group VIII elements, and at least one promoter element selected from the group formed by boron, silicon, and phosphorus, b) the dry solid that is obtained in step a) is calcined at a temperature of at least 150° C., d) the moist solid is left in a moist atmosphere at a temperature in the range 10° C. and 120° C., e) the solid obtained in stage d) is dried at a temperature in the range 60° C. and 150° C.

11. A process according to claim 9, in which the catalyst is sulphurised before bringing it into contact with the feed.

12. A process according to claim 10, in which the feed is treated at a temperature of more than 200° C., a pressure of more than 0.1 MPa, with a minimum quantity of hydrogen of 50 litres of hydrogen per liter of feed, and with an hourly space velocity in the range 0.1 to 20 volumes of feed per volume of catalyst per hour.

13. The process of claim 1, wherein the promoter element is boron or silicon.

14. The process of claim 10, wherein the precursor further comprises at least one Group IIA element.

15. The process of claim 10, wherein components of the precursor are formed together as a whole.

16. The process of claim 10, further comprising the following step c) in preparing the catalyst:

c) the solid precursor obtained in step b) is impregnated with at least one solution containing at least one element selected from the group consisting of elements of the Groups VIIB, VB, VIII, VIB and VIIA.

* * * * *